US008824109B2

(12) United States Patent
Ciesielski et al.

(10) Patent No.: US 8,824,109 B2
(45) Date of Patent: Sep. 2, 2014

(54) DISCONNECTOR FOR DISTRIBUTION TRANSFORMERS WITH DIELECTRIC LIQUID

(75) Inventors: Slawomir Ciesielski, Zgierz (PL); Pawel Klys, Lodz (PL); Marcin Klimek, Lodz (PL)

(73) Assignee: ABB Technology AG, Zurich (CH)

( * ) Notice: Subject to any disclaimer, the term of this patent is extended or adjusted under 35 U.S.C. 154(b) by 364 days.

(21) Appl. No.: 13/455,184

(22) Filed: Apr. 25, 2012

(65) Prior Publication Data

US 2012/0281321 A1 Nov. 8, 2012

(30) Foreign Application Priority Data

May 6, 2011 (EP) .................................... 11460024

(51) Int. Cl.

| | |
|---|---|
| ***H02H 7/04*** | (2006.01) |
| ***H01H 71/12*** | (2006.01) |
| *H01F 27/40* | (2006.01) |
| *H01H 85/30* | (2006.01) |
| *H01H 85/02* | (2006.01) |
| *H01H 85/20* | (2006.01) |

(52) U.S. Cl.

CPC ........ *H01H 71/122* (2013.01); *H01F 2027/404* (2013.01); *H01H 85/306* (2013.01); *H01H 2085/0291* (2013.01); *H01H 2085/2095* (2013.01)

USPC ................................ 361/38; 361/35; 361/37

(58) Field of Classification Search

CPC ....................................................... H02H 7/04

USPC ........................................................... 361/38

See application file for complete search history.

(56) References Cited

U.S. PATENT DOCUMENTS 6,839,207 B2 * 1/2005 Folliot et al. .................... 361/38

FOREIGN PATENT DOCUMENTS

| | | | |
|---|---|---|---|
| DE | 1065515 | 9/1959 | |
| EP | 0736945 | 9/1996 | ............. H01H 79/00 |
| EP | 1102379 | 5/2001 | ............... H02H 7/04 |
| EP | 2282322 | 2/2011 | ............. H01H 71/12 |

OTHER PUBLICATIONS

Search Report in corresponding application No. EP 11460024 completed Sep. 9, 2011.

* cited by examiner

*Primary Examiner* — Dharti Patel

(74) *Attorney, Agent, or Firm* — Renner Kenner Greive Bobak Taylor & Weber

(57) ABSTRACT

A disconnector for distribution transformers with dielectric liquid intended for comprehensive protection of a power grid or for protecting distribution transformers. The disconnector provides at least two cylindrical current-limiting fuses located inside a transformer tank. Each fuse is electrically connected with an external phase power supply through fixed contacts and moving contacts of the disconnector with the active part of the transformer. The disconnector has an additional auxiliary contact which is electrically connected to a switch connected to the active part of the transformer on a low voltage side of the transformer.

7 Claims, 3 Drawing Sheets

DISCONNECTOR FOR DISTRIBUTION TRANSFORMERS WITH DIELECTRIC LIQUID

CROSS-REFERENCE TO RELATED APPLICATION

This application claims priority of European patent application number 11460024 filed on May 6, 2011, and which is incorporated herein by reference.

TECHNICAL FIELD

The invention relates to a disconnector for distribution transformers with dielectric liquid intended for comprehensive protection of a power grid against the effects of failures caused by damage to the grid on the low voltage side or by damage to the transformer, and to an integrated system for protecting distribution transformers with dielectric liquid electrically connected with a switch at the low voltage side, or for distribution transformers operating in parallel in three-phase distribution grids.

BACKGROUND ART

Transformers filled with dielectric liquid and working in medium and/or high voltage grids incorporate protective systems whose function is to eliminate the effects of various failures and to disconnect power from the grid if there is an internal short circuit in the transformer. The protective systems contain current-limiting fuses with tripping devices which control the disconnector and which are coupled with a control sensor used to control the pressure and level of oil inside the transformer tank. Exceeding the predetermined parameters of oil level or pressure results in shorting of fuses and consequently in the disconnection of the transformer. In known solutions for protecting transformers against internal faults, the disconnector whose movable contacts are situated on a rotary strip, contains current-limiting fuses fixed to the rotary strip and suitably spaced in one row, the spacing resulting from the dimensions of the external insulators in which the current-limiting fuses are located.

A disconnector for transformers filled with dielectric liquid intended for use in systems protecting the operation of electric power equipment is known from patent description EP 2282322. The disconnector comprises at least two cylindrical current-limiting fuses which are located inside the transformer tank. Each fuse is electrically connected with the external phase power supply and through fixed contacts and moving contacts of the disconnector with the active part of the transformer. The current-limiting fuses are located in a common casing which also houses a slide with a pilot. The moving contacts of the disconnector are permanently fixed to do the slide and they move together with the slide when the slide makes a to-and-fro motion. The to-and-fro motion is caused by the action of a tripping device located in the current-limiting fuses and by compressing or stretching springs attached to the slide pilot and to the fixing disc which is provided with a slide guide. The disconnector is activated if a fuse is blown or if the indication of the oil level sensor or the pressure sensor exceeds the safe threshold value defined for the given transformer. In a situation where the transformer is connected in parallel on the secondary circuit side i.e. on the low voltage side with another electric unit, the action of the disconnector mounted on the high voltage side does not guarantee that current will stop flowing in the damaged circuits of the transformer. The value of current flowing in the damaged circuits of the transformer may be lower than the detection threshold of the disconnector mounted on the high voltage side, which may result in a build-up of the effects of the failure until the transformer explodes.

From patent application DE1065515 there is known a combination of a disconnection fuse and a low voltage disconnection switch. In the presented solution the striker pins of the fuse mechanically actuate a low voltage switch used to switch off low voltage side.

SUMMARY OF THE INVENTION

The essence of the disconnector according to the invention, comprising current-limiting fuses located in the tank which are electrically connected with external phase power supply and, through fixed contacts of the main contact and moving contacts of the main contact of the disconnector, with the active part of the transformer comprising the primary circuit and the secondary circuit of the transformer, the current-limiting fuses being located in a common casing of the disconnector which houses a slide with a pilot, which slide is coupled with a fixing disc through springs, is that the disconnector is furnished with an additional auxiliary contact being a kind of a limit switch controlled by a roll. The switch is fixed to the fixing disc. A cam cooperating with the roll is attached to the slide. The auxiliary contact is electrically connected with a switch connected to the active part of the transformer on the low voltage side of the transformer.

The additional auxiliary contact comprises at least one break contact (normally close).

In another embodiment the additional auxiliary contact comprises at least one make contact (normally open).

In some embodiments the additional auxiliary contact is connected with an electric releasing device of the disconnector on the low voltage side.

In some embodiments the transformer tank is provided with an additional cable culvert for electric cables that control the switch on the low voltage side.

The protective system for distribution transformers with dielectric liquid comprising a switch located on the low voltage side is that it incorporates a disconnector which is located on the high voltage side and which is electrically coupled with the switch located on the low voltage side.

The disconnector which is electrically coupled with the switch is situated inside the transformer tank.

The advantage of the disconnector according to the invention, provided with a protection in the form of an additional auxiliary contact, connected with a switch located on the low voltage side is that it provides effective disconnection of the transformer from a three-phase distribution network and thus it provides protection of the transformer against explosion as well as protection of the distribution network in case of failures detected on the low voltage side. In the protective system, the control signal is supplied to the low voltage-side switch causing three-phase disconnection from the network also on the LV side. If the disconnection of one transformer working in a distribution network has been due to the failure of the transformer itself, the other transformers in the network and other electric power equipment can continue normal operation. The network can continue supplying electric energy. Only the power-carrying capacity of the network is reduced by the power of the disconnected transformer. The protection on the low voltage side works autonomously and it protects the transformer against the effects of damage to the network on the low voltage side independently of the protection on the high voltage side.

BRIEF DESCRIPTION OF THE DRAWINGS

The solution according to the invention is presented as an embodiment in the drawing, where.

BEST MODE FOR CARRYING OUT THE INVENTION

Figure 1:
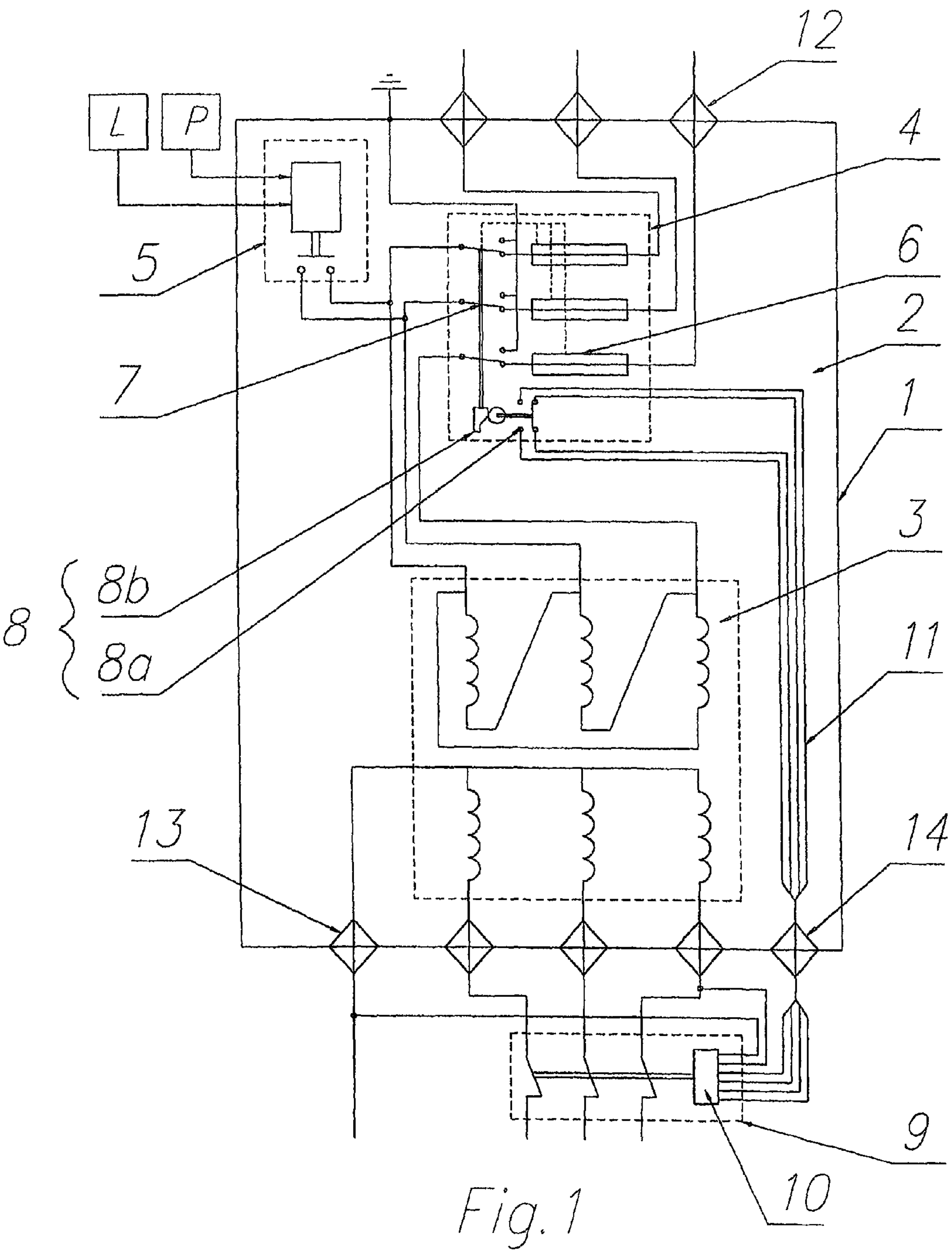
FIG. 1 shows the electric diagram of the transformer comprising the disconnector according to the invention.
Figure 2:
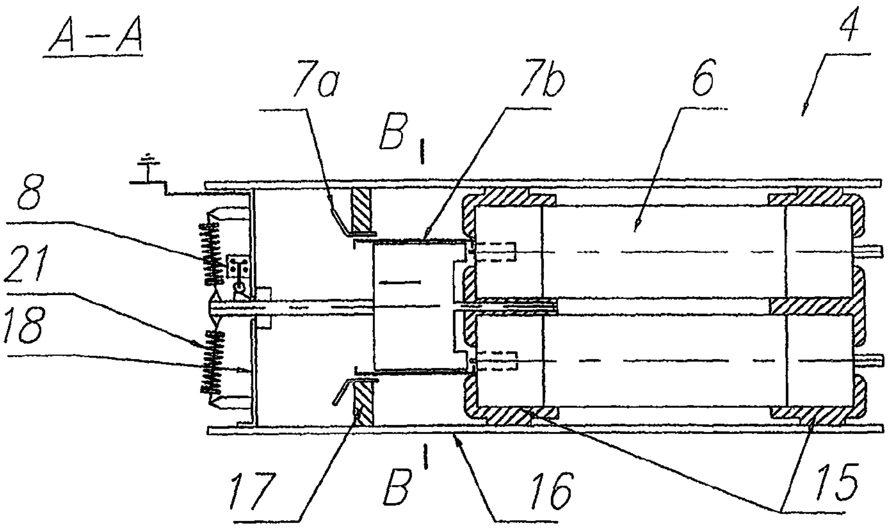
FIG. 2 shows the disconnector in side section along line A-A in closed state.
Figure 3:
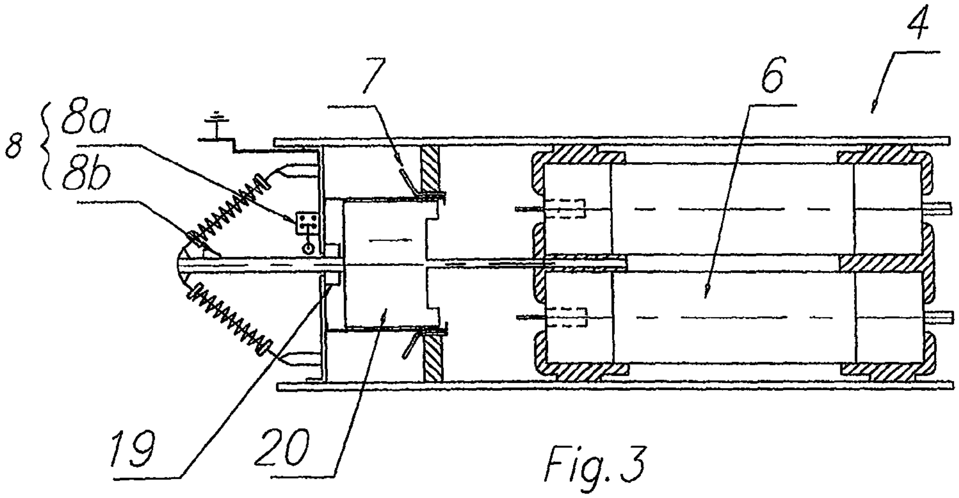
FIG. 3 shows the disconnector in side section along line A-A in open state.
Figure 4:
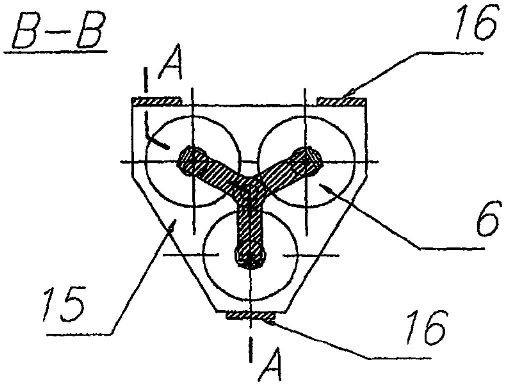
FIG. 4 shows a frontal section of the disconnector along line B-B, FIG. 5 1shows the electric diagram of the protection system with the disconnector according to the invention.

A distribution transformer has a closed tank 2 which houses an active part of the transformer 3, schematically shown in FIG. 1, comprising a magnetic core not shown in the drawing, primary windings of the transformer forming the primary circuit of the transformer, and secondary windings forming the secondary circuit of the transformer. The active part 3 is located in the tank 2 and immersed in transformer oil. Inside the tank 2 there is a disconnector 4 which is electrically coupled with the contacts of an oil level and pressure sensor 5, where the letter "L" denotes oil level, and the letter "P" denotes the pressure head. The disconnector 4 comprises at least two cylindrical current-limiting fuses 6 with tripping devices, and the drawing shows an embodiment with three fuses whose longitudinal axes are situated parallel to one another. Main contacts 7 of the disconnector are electrically connected with a primary winding of the active part 3 of the transformer 1. The disconnector 4 is provided with an additional auxiliary contact 8 through which the disconnector 4 is electrically coupled with a switch 9 electrically connected with the secondary winding of the active part 3 of the transformer 1. The switch 9 is situated outside the tank 2 and it contains an electric releasing device 10 which through wires 11 is connected with the contacts of the additional auxiliary contact 8, which contacts are provided with a fixed contact element 8*a* and a moving element 8*b* forming the additional auxiliary contact 8. In the upper part of the tank 2 there are tightly located high voltage bushings 12 through which the active part 3 of the transformer and the disconnector 4 are supplied. In the bottom part of tank 2 there are located low voltage culverts 13 through which voltage is received from the secondary winding of the active part 2 and an additional cable culvert or a bushing 14. The culverts 12, 13 and 14 can be fixed also in the side walls of the tank or in the upper part of the tank, which is not shown in the drawing. The tripping-device fuses 6 are located in the disconnector casing 15 formed by fuse clamps connected by rods 16 with an insulating ring 17 and a fixing disc 18. To the insulating ring there is fastened a fixed contact 7*a* of the main contact 7 whose moving contact 7*b* is situated on a slide 20. The fixing disc 18 is provided with a slide pilot 19 in which the slide 20 makes a to-and-fro motion. To the outside surface of the fixing disc 20 there are radially fixed springs 21 and the additional auxiliary contact 8 whose fixed element 8*a* is made in the form of a body with a make contact and/or a break contact and with an arbor and a roll and which is fastened to the surface of the fixing disc 18. The moving element 8*b* of the auxiliary contact, in the form of a cam, is rigidly fastened to the final part of the pilot 19 and it functions together with the roll. The additional auxiliary contact 8 is furnished with at least one pair of make and/or break contacts, which is schematically shown in the drawing.

The disconnector with the additional contact 8 operates in the following way:

The current-limiting fuses 6 set in the casing 15 are located axially-symmetrically around the longitudinal axis parallel to the axis of motion of the slide 20 which moves together with the moving contacts 7*b* located on it. In closed position in which the fixed contacts 7*a* fastened to the insulating ring 17 are connected with the fuse 6 through the moving contacts 7*b*. At the moment of the action of the fuse 6 the fuse 6 pin moves violently out, hits the slide 20 and moves it towards the fixing disc 18 to a position in which, after going beyond the point of equilibrium, a system of springs 21 imparts further motion to the slide 20 moving it to the extreme position. At the same time, the sliding motion of the slide 20 is accompanied by a relative shift of the cam 8*b* which is fixed to it and which cooperates with the roll 8*a* of the limit switch which is fastened to the fixing disc 18, which causes the activation of the auxiliary contact 8, make or break type, which cooperates with the electric releasing device 10 of the switch 9.

In the system according to the invention, a transformer 1 has a disconnector on the high voltage side and a switch on the low voltage side, which are electrically coupled with each other. This coupling is realized in such way that if the disconnector 4 on the high voltage side comes into action, then also the switch on the low voltage side will open automatically, because in the disconnector 4 there is an additional contact 8 in the form of a break contact that opens if the disconnector on the high voltage side comes into action, actuating an electric releasing device 10 of the switch 9 on the low voltage side. If the additional contact 8 has the form of a make contact which closes if the disconnector on the high voltage side comes into action, then it will also actuate the electric releasing device 10 of the switch 9. The form of the additional contact 8, make and/or break type, depends on the type of the applied electric releasing device 10 of the switch 9.

Figure 5:
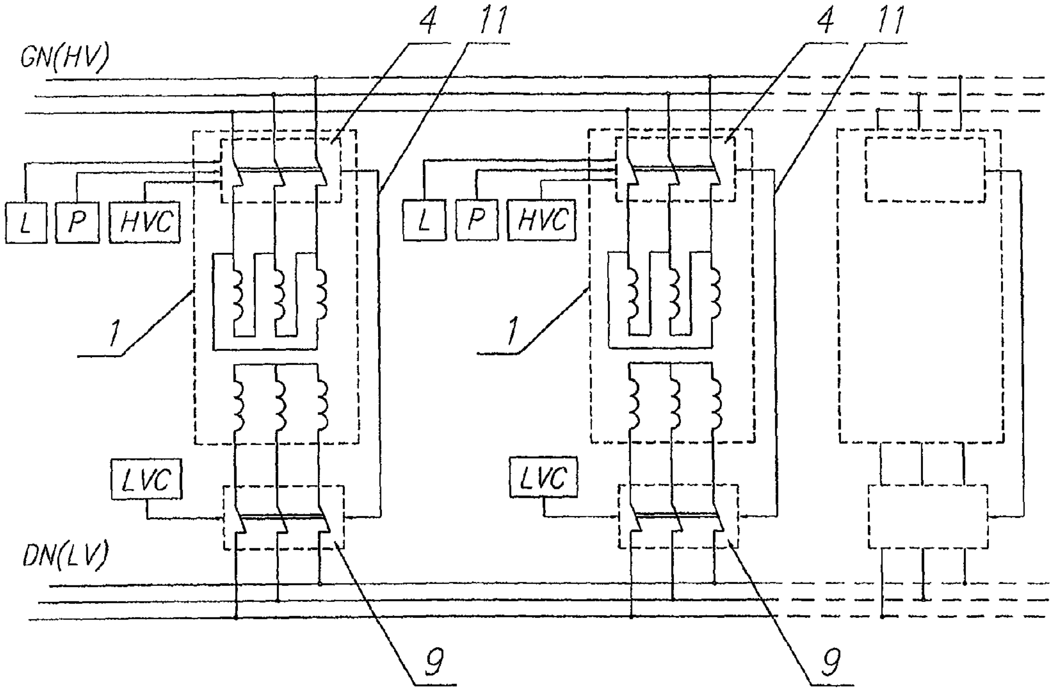

The protection system presented in FIG. 5 shows at least two transformers 1 connected in parallel to an electric network. On the high voltage side of each of them there is the disconnector 4. On the low voltage side there is the switch 9. The action of the disconnector 4 can be caused by a reduction in the oil level "L", an increase in the pressure "P" in the tank of the transformer 1 or the appearance of overload current or fault current "HVC" on the high voltage side. Action of the switch 9 can be caused by the appearance of overload current or fault current "LVC" on the low voltage side or by the action of the disconnector 4 which transmits the electric signal from the additional contact 8 to the releasing device 10 of the switch 9 through leads 11.

"Disconnector for Distribution Transformers with Dielectric Liquid"

1. the transformer

2. the tank

3. the active part of the transformer

4. the disconnector

5. the oil pressure and level sensor

6. the current-limiting fuse

7. the main contact

7*a*—the fixed contact of the main contact

7*b*—the moving contact of the main contact

8. the additional auxiliary contact

8*a*—the fixed element of the auxiliary contact in the form of a body with a make contact (NO) and/or a break (NC) contact and with a pin with a roll

8*b*—the moving element of the auxiliary contact in the form of a cam cooperating with the roll of the additional auxiliary contact

9. the switch

10. the electric releasing device

11. the electric leads

12. the high voltage culvert

13. the low voltage culvert

14. the additional cable culvert/bushing

15. the disconnector casing

16. the connecting rod of the casing

17. the insulating ring of the fixed contacts

18. the fixing disc

19. the slide pilot

20. the slide

21. the spring

L—oil level in the transformer tank

P—pressure in the transformer tank

GN/HV—high voltage

DN/LV—low voltage

HVC—overload current or fault current on the HV side

LVC—overload current or fault current on the LV side

The invention claimed is:

1. A disconnector for distribution transformers with dielectric liquid comprising current-limiting fuses located in the transformer tank which are electrically connected with an external phase power supply and through fixed contacts of the main contact and moving contacts of the main contact of the disconnector with the active part of the transformer comprising the primary circuit and the secondary circuit of the transformer, the current-limiting fuses being located in a common casing of the disconnector which houses a slide with a pilot, which slide is coupled with a fixing disc by means of springs, characterized in that the disconnector is furnished with an additional auxiliary contact being a kind of a limit switch controlled by a roll which is fixed to the fixing disc, and having a cam cooperating with the roll, which is fastened to the slide, said auxiliary contact is electrically connected with a switch connected to the active part of the transformer on the low voltage side of the transformer on the low voltage side of the transformer.

2. A disconnector according to claim 1, characterized in that the auxiliary contact is a break contact.

3. A disconnector according to claim 1, characterized in that the fixed auxiliary contact is a make contact.

4. A disconnector according to claim 1, characterized in that the auxiliary contact is connected with an electric releasing device of the switch on the low voltage side.

5. A disconnector according to claim 1, characterized in that the transformer tank is provided with and additional cable culvert for electric leads that control the switch on the low voltage side.

6. A protection system for distribution transformers with dielectric liquid according to claim 1, comprising a switch located on the low voltage side, and the disconnector which is located on the high voltage side and which is electrically coupled with the switch situated on the low voltage side.

7. A system according to claim 6, characterized in that the disconnector is located inside the transformer tank.

* * * * *